(12) United States Patent
Hohn et al.

(10) Patent No.: US 8,430,957 B2
(45) Date of Patent: Apr. 30, 2013

(54) LOW MOLAR, HOMOGENEOUSLY SUBSTITUTED HEC FOR USE IN CEMENT-BASED SYSTEMS

(75) Inventors: Wilfried Adolf Hohn, Erfstadt (DE); Kirill N. Bakeev, Newark, DE (US); John Kenneth Bard, Wilmington, DE (US); Michael Dittel, Dusseldorf (DE); Teng-Shau Young, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 13/484,982

(22) Filed: May 31, 2012

(65) Prior Publication Data

US 2012/0312195 A1 Dec. 13, 2012

Related U.S. Application Data

(60) Provisional application No. 61/520,409, filed on Jun. 9, 2011.

(51) Int. Cl.
*C04B 24/38* (2006.01)
*C04B 28/02* (2006.01)

(52) U.S. Cl.
USPC .............................. 106/805; 106/696; 106/730

(58) Field of Classification Search .................. 106/696, 106/730, 805
See application file for complete search history.

(56) References Cited

U.S. PATENT DOCUMENTS

| | | | | |
|---|---|---|---|---|
| 4,346,013 A | * | 8/1982 | Cadolle | 507/114 |
| 4,355,074 A | * | 10/1982 | Stemmler et al. | 428/350 |
| 4,462,836 A | * | 7/1984 | Baker et al. | 106/720 |
| 4,462,837 A | * | 7/1984 | Baker et al. | 106/720 |
| 4,470,463 A | | 9/1984 | Holland | |
| 4,478,640 A | * | 10/1984 | Holland | 106/607 |
| 4,662,943 A | * | 5/1987 | Baker et al. | 106/720 |
| 4,687,516 A | | 8/1987 | Burkhalter et al. | |
| 4,784,693 A | * | 11/1988 | Kirkland et al. | 106/730 |
| 5,470,383 A | * | 11/1995 | Schermann et al. | 106/184.1 |
| 6,593,468 B1 | | 7/2003 | Lange et al. | |
| 2005/0139130 A1 | * | 6/2005 | Partain, III et al. | 106/730 |
| 2005/0241539 A1 | * | 11/2005 | Hagen et al. | 106/805 |
| 2005/0241542 A1 | | 11/2005 | Hagen et al. | |
| 2006/0199742 A1 | * | 9/2006 | Arisz et al. | 507/114 |

FOREIGN PATENT DOCUMENTS

| | | | |
|---|---|---|---|
| EP | 0471866 | | 8/1990 |
| EP | 0520413 | | 6/1992 |
| EP | 1411065 A1 | * | 9/2003 |
| EP | 1411065 A1 | | 4/2004 |
| EP | 1528805 | | 10/2004 |
| WO | 03106366 | | 12/2003 |
| WO | 2006088953 | | 6/2006 |
| WO | 2006094211 | | 8/2006 |
| WO | WO2006/094211 A1 | | 9/2006 |
| WO | 2008122345 | | 10/2007 |
| WO | 2008122344 | | 10/2008 |
| WO | 2010055214 | | 5/2010 |

OTHER PUBLICATIONS

International Search Report, PCT/US2012/041293, Aug. 27, 2012, pp. 2.

* cited by examiner

*Primary Examiner* — Anthony J Green
(74) *Attorney, Agent, or Firm* — Shaorong Chen; Joanne Rossi; Michael J. Herman

(57) ABSTRACT

Hydroxyethylcellulose with a low molar substitution and which is uniformly substituted is useful in cement-based systems, including mortars. The cement-based system exhibits long pot life, as well as very high water retention capability at hot temperature, as well as better paste stability and optimized setting behavior for hot as well as cold temperature compared to typical, cement-based systems with commercial cellulose ether compounds. Less hydrophilic cellulose ethers such as methylhydroxyethylcellulose can be added as a second cellulose ether.

8 Claims, 2 Drawing Sheets

LOW MOLAR, HOMOGENEOUSLY SUBSTITUTED HEC FOR USE IN CEMENT-BASED SYSTEMS

RELATED APPLICATION

This application is related to and claims the benefit of U.S. Provisional Patent Application Ser. No. 61/520,409, filed Jun. 9, 2011, the disclosure of which is incorporated herein by reference.

FIELD OF THE INVENTION

The present invention relates to cellulose ether compounds which are useful in cement-based systems, including mortars, for delivering long pot life as well as very high water retention capability at hot temperature while, providing better paste stability, optimized setting behavior for hot as well as cold temperature compared to typical, commercial cellulose ether compounds.

BACKGROUND OF THE INVENTION

In the dry mortar industry, cellulose ethers are typically used as water retention agents to achieve good water retention of the resulting wet mortar. Water retention is needed to control the water content for proper hydration of the mortar, including any binder, and to achieve good workability of the mortar. Secondary beneficial effects resulting from correct hydration performance of the mortar are proper strength development of the mortar and avoidance of cracks and sanding effects of the applied mortar layer.

Typical cellulose ethers used for dry mortar application are methyl hydroxyethyl cellulose (MHEC) and methyl hydroxypropyl cellulose (MHPC). Mortars containing MHEC and/or MHPC exhibit the desired properties of strength development, avoidance of cracks and sanding effects. Unfortunately, MHEC and MHPC typically do not afford mortars with hot temperature stability. Due to their hydrophobic character, they either do not properly dissolve at elevated temperatures or they precipitate and consequently become inactive upon temperature increase in the mortar.

Because of its hydrophilic nature, hydroxyethyl cellulose (HEC) does not precipitate in aqueous solutions in response to increased temperature and is capable of providing temperature stability to wet mortar, even at very high temperatures. Unfortunately, HEC does not provide sufficient air void stabilization in the resulting mortar, i.e. mortars containing HEC. In mortars containing standard HEC, the mortars exhibit small air bubbles which then coagulate into larger bubbles within the wet mortar. The resultant applied mortar containing standard HEC exhibits a bad and mostly unacceptable surface appearance due to the presence of these large bubbles in the mortar.

The need exists for a mortar which has the necessary pot life and open time under hot weather conditions to permit the application of the mortar while retaining enough water during mixing and upon application to result in a finished surface with the necessary functionality and aesthetics.

BRIEF DESCRIPTION OF THE INVENTION

The present invention relates to a cement-based system, such as a mortar, having improved pot life and open time under hot weather conditions. The cement-based system of the present invention contains cement, filler/aggregate and a rheology control agent including a low molar substitution (MS=1.8-2.2), "more uniformly" substituted HEC. The cement-based system also contains sufficient water to provide appropriate consistency to the cement-based system, such as a mortar. The rheology control agent of the cement based system may include a second cellulose ether which is less hydrophilic than said smooth type HEC. The rheology control agent is present in an amount of about 0.10% to about 1% by weight, based on the weight of the cement-based system on a dry basis. Generally the ratio of the second cellulose ether to hydroxyethylcellulose in the blend is in the range of about 10:90 to about 90:10 by weight. Typically, the second cellular ether will be methylhydroxyethylcellulose or methylhydroxypropylcellulose.

BRIEF DESCRIPTION OF THE FIGURES

Further embodiments of the present invention can be understood with the appended drawings.

DETAILED DESCRIPTION OF THE INVENTION

Figure 1:
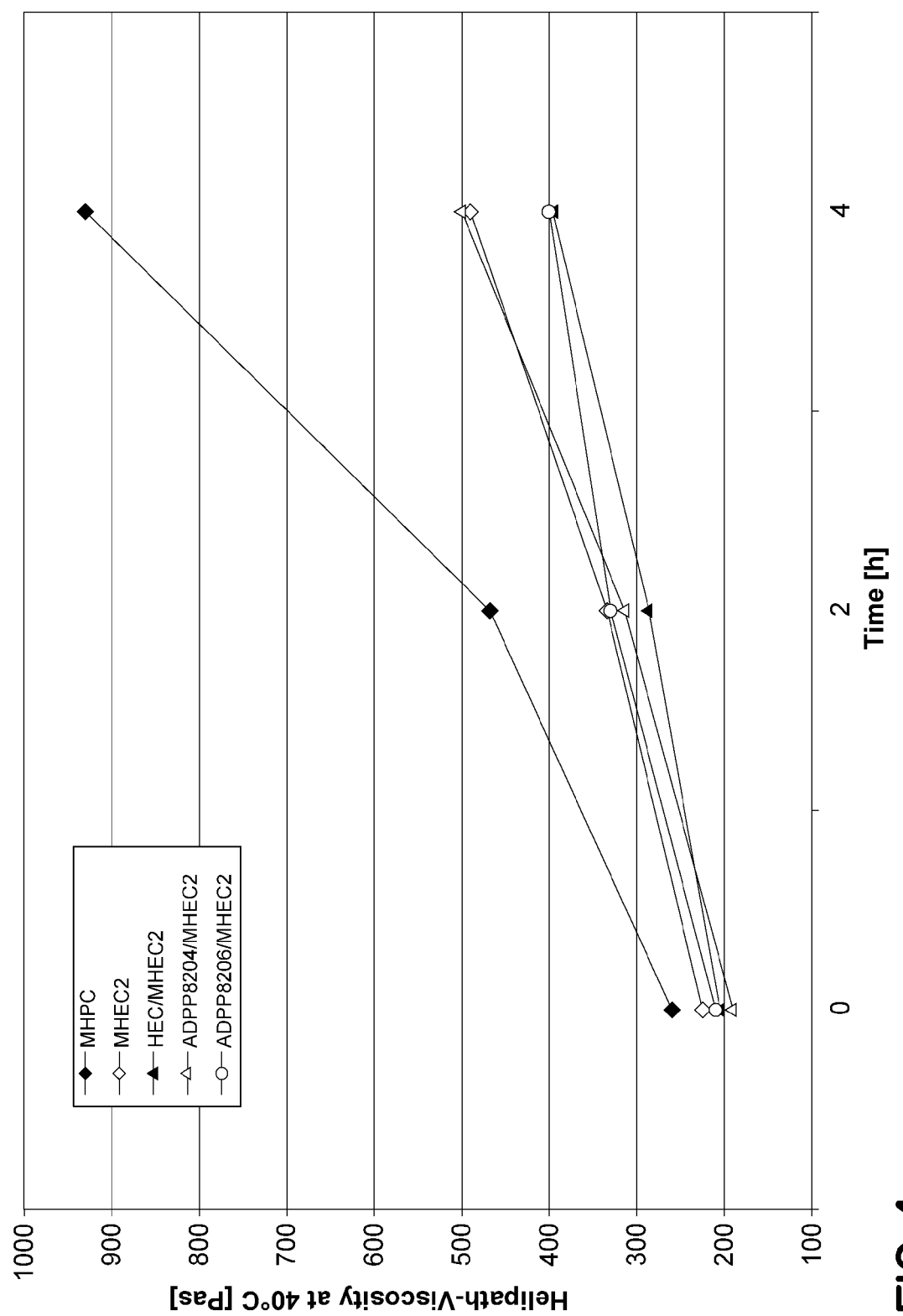
FIG. 1 is a graph of the viscosity at 40° C. of different MHEC/HEC blends (50:50) in EIFS.

The present invention relates to a cellulose ether product for use in cement-based systems such as mortar applications under hot climate conditions. The cellulose ether product of the present invention improves various important application process-related parameters like water retention, pot life, and open time at high temperatures.

The cellulose ether product of use in cement-based systems of the present invention, such as dry mortar applications, is a low molar substitution (MS=1.8-2.2), smooth-type HEC. For the purposes of this application, "smooth-type" is characterized by a lower percent of released glucose compared to commercial HEC that correlates with lower percent of unsubstituted AGUs and lower MS/DS ratio which is indicative or more homogeneous distribution of EO substitution along cellulose backbone in "smooth-type" substituted HEC than in standard commercial HEC. The low molar substitution smooth-type HEC of use in the present invention may be the water-soluble, low HE-MS HECs and modified HECs taught in US Application Publication No. US2006/0199742 (see also WO 2006/094211 (A1)), the disclosures of which are incorporated herein by reference in their entireties. The low MS, smooth-type, HEC of use in the present invention provides the hot temperature stability of standard commercial HECs while exhibiting improved wet mortar structure, higher aqueous viscosities and water retention capabilities. Moreover, due to its low, but more uniform, ethylene oxide substitution, the use of low MS, smooth-type, HEC results in cement-based mortars exhibiting acceptable setting behavior at room, as well as at elevated temperatures.

The low MS, smooth-type HEC may also be blended with other cellulose ethers (CE) that are less hydrophilic, such as methylhydroxyethylcellulose (MHEC) or methylhydroxypropylcellulose (MHPC) for use in cement-based systems. The CE/HEC-blends containing low MS, smooth-type, HEC provide advantages in comparison to blends containing standard commercial HECs. Since low MS, smooth-type, HEC provides improved air void stabilization and better mortar structure than standard commercial grade HECs, a higher percentage of HEC may be used in CE/HEC blends while still achieving acceptable mortar structure known for cement-based systems containing only MHEC or MHPC. The higher amount of HEC within the CE-mixture results in improved hot temperature stability compared to MHEC/MHPC-rich blends containing standard commercial HECs. Moreover, setting behavior of the resulting mortar containing CE/HEC-blends containing low MS, smooth-type, HEC is acceptable for both, cold as well as hot temperature conditions.

The low MS, smooth-type, HEC results in cement-based systems exhibiting higher aqueous viscosities compared to HEC with higher MS. Use of low MS, smooth-type, HEC provides advantages of either achieving higher aqueous HEC viscosities and improved water retention capabilities or permitting the use of lower viscosity cellulose furnish to achieve similar viscosities HEC to standard commercial HEC grades.

The cement-based systems contain various components including a cement, a filler/aggregate, a rheology control agent containing the low MS, smooth-type, HEC and may also include other CE as a blend including a blend of methylhydroxyethylcellulose and methylhydroxypropylcellulose, and sufficient water to provide appropriate consistency to the cement-based system. The rheology control agent may be present in an amount of about 0.1% to about 1% by weight, based on the weight of the cement-based mortar on a dry basis. The term "cement" is intended to include, but is not limited to: hydraulic cements, such as Portland Cement, Composite Cements, which are blended cements containing Portland Cement and other components like, e.g., fly ash, blast furnace slag, calcium carbonate, pozzolans, and the like, and mixtures thereof, or alumina cement, and the like, and mixtures thereof.

Any type of filler/aggregate that is commonly used in the building industry may be used effectively in the context of this invention. Examples of suitable filler/aggregates such as silica sands, calcium carbonate, dolomite, as well as lightweight aggregates such as perlites, polystyrene beads, hollow/expanded glass or ceramic spheres cork, rubber, and the like, and mixture thereof. The proportion of filler/aggregate in the mortar is preferably between 50% and around 85%, more preferably between 60% and around 80%, and most preferably between 65% and around 75% by weight, based on the total dry ingredients.

The rheology control agent of use in the cement-based system of the present invention may be the low MS, smooth-type, HEC or a blend of the low MS, smooth-type, HEC with another CE such as methylhydroxyethylcellulose (MHEC) or hydroxypropylcellulose (MHPC). The blend of MHEC and low MS, smooth-type, HEC as rheology control agent present in the cement-based system may be in a ratio of MHEC to low MS, smooth-type, HEC of about 10:90 to about 90:10, preferably about 30:70 to about 70:30 or about 50:50.

In cement-based systems, such as skim coats or in an EIFS mortar, the water retention of the cement-based system is mainly influenced by CE. Typical cellulose ethers such as methylhydroxypropylcellulose (MHPC) or methylhydroxyethylcellulose (MHEC) perform well at temperatures up to 40° C., but at higher temperatures, water retention capability of cement-based systems, such as skim coats or EIFS mortars relying solely on these typical cellulose ethers suffers significantly. Crack formation and powdering effects observed in EIFS mortars are the consequences of insufficient water retention.

It is well known that water retention capability of standard commercial HEC is very stable at high temperatures. However, standard commercial HEC shows a lack in paste stability, which results in poor workability and surface appearance.

The examples are presented to illustrate the invention, parts and percentages being by weight, unless otherwise indicated.

EXAMPLES

A typical cement-based skim coat or EIFS mortar can contain some or all of the following components:

TABLE 1

Typical Composition of cement-based skim coat

| Component | Typical amount [wt %] | Examples |
|---|---|---|
| Cement | 0-60% | CEM I (Portland cement), CEM II, CEM III (blast-furnace cement), CEM IV (pozzolana cement), CEM V (composite cement), CAC (calcium aluminate cement) |
| Other mineral binders | 0.5-30% | Hydrated lime, gypsum, lime, pozzolana, blast furnace slag, and hydraulic lime |
| Aggregate/light weight aggregate | 5-90% | Silica sand, dolomite, limestone, perlite, EPS (expanded polystyrene), hollow glass spheres, expanded vermiculite |
| Spray dried resin | 0-4% | Homo-, co-, or terpolymers based on vinyl acetate, maleic ester, ethylene, styrene, butadiene, vinyl versatate, and/or acrylic monomers |
| Accelerator/retarder | 0-2% | Calcium formate, sodium carbonate, lithium carbonate, tartaric acid, citric acid, or other fruit acids |
| Cellulose ether | 0.1-0.7% | Methylcellulose (MC), methylhydroxyethylcellulose (MHEC), methylhydroxypropylcellulose (MHPC), ethylhydroxyethylcellulose (EHEC), hydroxyethylcellulose (HEC), hydrophobically modified hydroxyethylcellulose (HMHEC) |
| Other additives | 0-1% | Air entraining agents, defoamers, hydrophobic agents, wetting agents, superplasticizers, anti-sag agents, calcium- complexing agents |
| Fibre | 0-5% | Cellulose fibre, polyamide fibre, polypropylene fibre |

The following analytical methods were used to determine the parameters used in this specification.

Unsubstituted Anhydroglucose Units (Unsub. AGU) by Hydrolysis—Ion Chromatography Approximately 0.3 gram of sample is hydrolyzed to glucose and substituted glucose by treating with 3 milliliters of 72% sulfuric acid, diluting with water to 0.36 molar acid, and refluxing for five hours. The solution is analyzed by ion exchange chromatography with pulsed amperometric detection with a high pH eluent. The concentration of unsubstituted anhydroglucose is quantified after calibration with a glucose standard.

HEC Molar Substitution Analysis (HE-MS by Sealed Tube Zeisel—Gas Chromatography)

Approximately 90 milligrams of sample, the weight corrected for total volatiles and salt content is placed in a pressure tube 57% aqueous HI, and an o-xylene solution of the internal standard 2,5-dimethylhexane and heated at 185 degrees Celsius for 2 hours in an aluminum block. The ethyl iodide formed from the hydroxyethyl functional group is extracted into the xylene layer as it is formed. After cooling the xylene layer is analyzed by gas chromatography using a 30 m×0.53 mm id column containing a 2.65 micrometer bonded methyl silicone stationary phase and a flame ionization detector. The percentage of ethyl iodide formed is calculated using its response relative to the 2,5-dimethylhexane internal standard, and the molecular substitution (MS) is calculated from that result.

Brookfield Viscosity Measurement

Aqueous 1.0 wt % HEC solutions were prepared by dissolving about 2.5 grams of moisture corrected HEC powder for at least 16 hours. The viscosity of the sample solution is measured with a Brookfield viscometer with a LVT spindle number 4 at 30 rpm at 25° C.

Enzymatic Released Glucose 1.5 g of a 2% HEC solution, 1.5 ml double strength acetate buffer (pH 4.8) and 30 μl Celluclast 1.5 L are mixed and incubated for 18.5 hours at 45° C., followed by heating of the reaction mixture to 100° C. for 30 min. The amount enzymatically released glucose in the sample is measured spectrophotometrically using commercial test kits of for the determination of glucose by the GOD-PAP Method or the Hexokinase Method. The quantification is done via calibration using a series of glucose standard solutions.

TABLE 2A

Analytical data of tested HEC samples

|  | Standard Commercial HEC | (ADPP8204) EX 1A | (ADPP8205) EX 1B | (ADPP8206) EX 1C | (ADPP8281) EX 1D | ((ADPP8322) EX 1E |
|---|---|---|---|---|---|---|
| HE-MS | 2.5 | 2.2 | 2.1 | 1.8 | 2.3 | 2.2 |
| Brookfield viscosity [mPas]* | 2000 (average) | 3900 | 1900 | 2500 | 2900 | 2700 |
| Released glucose | 25 | 7 | 10 | 12 | 11 | 11 |

*Brookfield viscosity LVT Spindle 4, 30 rpm, 1% solution

TABLE 2B

Analytical data of tested HEC samples

| | | | Linkage Analysis | | |
|---|---|---|---|---|---|
| Sample | un-sub AGU %* (wt) | DS (mass spec) | MS (mass spec) | MS/DS | un-sub AGU % (mol) |
| (ADPP 8204) EX 1A | 7.0 | 1.39 | 1.83 | 1.32 | 15.7 |
| (ADPP 8206) EX 1C | 9.9 | 1.28 | 1.61 | 1.26 | 19.4 |
| Standard Commercial HEC | 9.0 | 1.31 | 2.09 | 1.60 | 15.9 |

*measured by IC

There is a correlation between the amount of released glucose and MS/DS, % un-substituted AGUs, for the samples in Table 2B (1-2). The examples of the low MS, smooth-type, HEC EX 1A and EX 1C are characterized by lower percent of released glucose compared to a standard commercial HEC (Natrosol® 250 HR hydroxyethylcellulose, available from Hercules Incorporated) that correlates with lower percent of un-substituted AGUs and lower MS/DS ratio for low MS, smooth-type, HEC samples indicating more homogeneous distribution of EO substitution along cellulose backbone in developmental HEC samples.

TABLE 3

Analytical data of tested MHEC/MHPC samples

|  | MHEC 1 | MHEC 2 | MHPC |
|---|---|---|---|
| % OCH3 | 23.0-25.0 | 23.0-25.0 | 19.0-24.0 |
| CH₃CH₂OOH | 8.0-10.0 | 8.0-10.0 | 0 |
| CH₃CH₂CH₂OOH | 0 | 0 | 4.0-12.0 |
| Brookfield viscosity RVT Spindle 6 [mPas], 20 rpm, 2% solution | 55000 | 40000 | 41000 |

Example 1

All tests were conducted in a skim coat-mixture of 35.0 wt % Portland Cement CEM I 52.5N, 5.0 wt % hydrated lime, 59.2 wt % quartz sand, 0.3 wt % cellulose ether.

Test Procedures:

Water Retention Capability

The water retention tests were run according to the following procedure:

Within 5 seconds, 400 g of dry mortar were added to the corresponding amount of water. After mixing the sample for 50 seconds using a kitchen hand mixer, the resulting sample was allowed to mature for 5 minutes. Then, the mortar was mixed up for another 10 seconds and filled into a plastic ring, which was positioned on a piece of filter paper. Between the filter paper and the plastic ring, a thin fiber fleece was placed while the filter paper was lying on a plastic plate. The weight of the arrangement was measured before and after the mortar was filled in. Thus, the weight of the wet mortar was calculated. Moreover, the weight of the filter paper was known. After soaking the filter paper for 5 min, the weight of the filter paper was measured again. Now, the water retention [%] was calculated using the following formula:

$$WR[\%] = 100 - \frac{100 \times WU \times (1 + WF)}{WP \times WF}$$

with WU=water uptake of filter paper [g]
WF=water factor*
WP=weight of plaster [g]

* water factor: amount of used water divided by amount of used dry mortar, e.g., 20 g of water on 100 g of dry mortar results in a water factor of 0.2

Pot Life

The pot life tests were run according to the following procedure:

Within 5 seconds 400 g of dry mortar were added to the corresponding amount of water. After mixing the sample for 50 seconds using a kitchen hand mixer, the resulting sample was allowed to mature for 5 minutes. Then the mortar was mixed up for another 10 seconds and filled into cup. Mortar consistency was measured by hand immediately and in 30 min time intervals. Pot life is finished when mortar consistency increases significantly.

Results:

Pot life is essential to ensure proper workability of the cement-based system, such as mortars, of a sufficient period of time. While having temperature stability, a user can avoid premature hardening of the cement-based system in the work bucket, complaints regarding the addition of too much water to the cement-based system, and undue waste of resulting from premature hardening of material. The benefits of increased pot life for cement-based systems include a longer period of time where the cement-based system remains workable and a higher application efficiency.

Water retention and pot life of pure MHPC as well as MHEC/HEC-blends, either based on standard commercial HEC or low MS, smooth-type HEC, were tested in the skim coat basic mixture. The outcome is shown in table 4.

TABLE 4

Testing of different MHEC/HEC blends in skim coat

| | Cement-based skim coat | | |
|---|---|---|---|
| | MHPC | MHEC 1/standard commercial HEC 70/30 | MHEC 1/EX1D (low MS, smooth-type HEC) (ADPP8281) 70/30 |
| Brookfield viscosity RVT Spindle 6 [mPas], 20 rpm, 2% solution | 41000 | 34000 | 35500 |
| Water factor | 0.25 | 0.25 | 0.25 |
| Water retention (%), 20° C. | 99.0 | 98.9 | 98.8 |
| Water retention (%), 70° C. | 95.9 | 98.3 | 98.3 |
| Pot life (min), 40° C. | 150 | 180 | 180 |

Water retention capability upon usage of HEC/MHEC1-blends is very stable at high temperatures. While comparing HEC/MHEC1 blends to pure MHPC grades a clear improvement in water retention capability at elevated temperatures (70° C.) could be identified, even although their viscosities were lower compared to the reference sample. Results indicate that the low MS, smooth-type HEC of EX1D and the standard commercial HEC provide similar water retention at 20° C. and 70° C. Moreover, pot life results are also comparable and clearly improved compared to MHPC-chemistry.

Example 2

All tests were conducted in a skim coat-mixture of 35.0 wt % Portland Cement CEM I 52.5N, 5.0 wt % hydrated lime, 59.2 wt % quartz sand, 0.3 wt % cellulose ether.
Test Procedures:
Paste Stability
The paste stability tests were run according to the following procedure:
Within 5 seconds 400 g of dry mortar were added to the corresponding amount of water. After mixing the sample for 50 seconds using a kitchen hand mixer, the resulting sample was allowed to mature for 5 minutes. Then the mortar was mixed up for another 10 seconds. One part of the mortar was evenly spread in a thin layer on gypsum plaster board. The other part was filled into a cup.
Paste stability of the mortar was evaluated visual in the cup and on the plaster board after 90 minutes.

Cellulose ethers are surface active additives which reduce mortar density. Cellulose ether entrains very small air pores into the mortar. It is essential to stabilize air pores as long as possible. Air pores of mortar with poor paste stability coagulates to greater voids. As a consequence workability of the mortar as well as its surface appearance suffers.
Results:
Paste stability of regular HEC in cement-based skim coat is a critical issue. Table 5 illustrates that blends containing low MS, smooth-type HEC provide improved application performance to cement-based skim coat with respect to paste stability and workability. Cement-based skim coats containing the low MS, smooth-type HEC demonstrate the mentioned application advantages over standard commercial HEC while still having hot temperature stability.

TABLE 5

Testing of different MHEC/HEC blends in skim coat

| | Cement-based skim coat | | |
|---|---|---|---|
| | MHPC | MHEC 1/standard commercial HEC 60/40 | MHEC 1//EX1E (low MS, smooth-type HEC) (ADPP8322) 60/40 |
| Water factor | 0.25 | 0.25 | 0.25 |
| Workability | good | acceptable | good |
| Paste stability | very good | acceptable | very good |

Example 3

All tests were conducted in an EIFS-mixture of 24.0 wt % Portland Cement CEM I 52.5R, 53.0 wt % quartz sand F34, 20.0% Sand 0.5-1 mm, 3.0% Aquapas™ N2095 redispersible powder (available from Ashland Inc.), 0.2% zinc stearate and 0.15 wt % cellulose ether.
Test Procedures:
Pot Life
The pot life tests were run according to the following procedure:
All samples and the used tools were stored before for minimum 2 hours in a heater at 40° C. Within 5 seconds, 400 g of dry mortar were added to the corresponding amount of water at 40° C. After mixing the sample for 45 seconds using a kitchen hand mixer, the resulting sample was allowed to mature for 5 minutes. After mixing, the sample was covered and stored 5 min. in a heater at 40° C. Before measuring the Helipath viscosity, the sample was remixed for 5 sec. with hand mixer as previously mentioned. For each sample, a Helipath viscosity was determined after 0 min., 30 min. and every 30 min. thereafter for up to 4 hours. The time point at which the Helipath viscosity will be higher as 800 000 mPas was defined as pot life.
Results:
The following samples were described in Table 3 and used for these investigations: MHPC as reference, MHEC 2 with same viscosity as reference and HEC/MHEC2 blend with ratio 50/50%.

Pot life of a cement-based system is important to ensure proper workability over a long period of time (1-4 hours). MHPC does not meet user requirements, especially at high temperatures. A blend of MHEC2 and HEC (50:50) improved pot life significantly. As shown in FIG. 1, mortar consistency was maintained for a longer time period. While having temperature stability premature mortar hardening in the bucket was avoided (less loss of material due to premature hardening). The benefits of increased pot life for cement-based systems include a longer period of time where the cement-based system remains workable and higher application efficiency.

Figure 2:
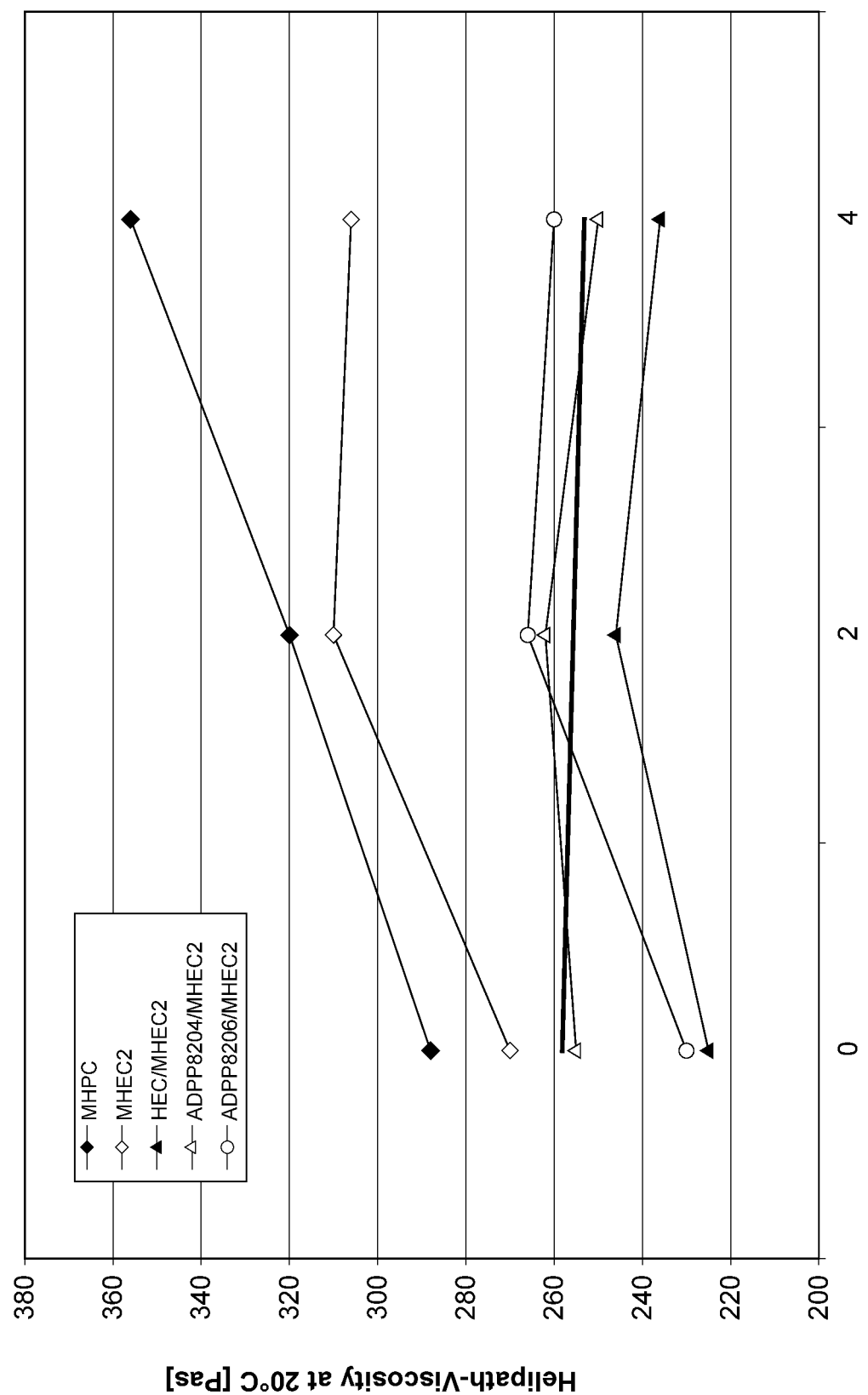
FIG. 2 is a graph of the viscosity at 20° C. of different CEs as well as MHEC/HEC blends (50:50) in EIFS.

All samples were tested also at room temperature. The results are shown in FIG. 2. A prolongation of pot life at room temperature could be determined. By using of MHEC2/HEC blends, the viscosities of the cement-based systems did not increase over time.

The low MS, smooth-type HEC samples performed very well at high temperatures and good at room temperature.

Example 4

All tests were conducted in an EIFS-mixture of 24.0 wt % Portland Cement CEM I 52.5N, 53.0 wt % quartz sand F34, 20.0% Sand 0.5-1 mm, 3.0% Aquapas™ N2095 redispersible powder (available from Ashland Inc.), 0.2% zinc stearate and 0.15 wt % cellulose ether.

Test Procedure:
Water Retention
All material and used tools were stored in a heater at 70° C. As described in Example 3, standard mixing for EIFS basic mixture was done. After maturing time 15 sec, remixing on step 1 with a hand mixer was done. Then, the mortar was filled into a metal ring, which was positioned on a piece of filter paper. Between the filter paper and the metal ring, a thin fiber fleece was placed while the filter paper was lying on a plastic plate. The weight of the arrangement was measured before and after the mortar was filled in. Thus, the weight of the wet mortar was calculated. Moreover, the weight of the filter paper was known. The complete filled system was placed in the heater at 70° C. for a soaking time of 5 min. After soaking, the weight of the filter paper was measured again. Now, the water retention [%] was calculated.

Results:
The following samples were investigated (for details, see Table 3):
MHPC and MHEC 2 as reference
HEC/MHEC blends in ratio of 50/50%.

Water retention capability upon usage of HEC/MHEC2-blends was very stable at high temperatures. While comparing HEC/MHEC2 blend to pure MHPC grades, a clear improvement in water retention capability at elevated temperatures (60° C.) was identified, even although their viscosities were clearly lower compared to the reference sample. Results (see Table 6) indicate that the low molar, homogeneously substituted HECs increase the water retention capability at 60° C. in comparison to the regular HEC. At 20° C., they provide similar water retention properties.

TABLE 6

Water retention of different MHEC/HEC = 50/50 blends in EIFS external finishing insulation systems

|  | MHPC | MHEC2/ HEC | MHEC2/ ADPP8204 (EX 1A) | MHEC2/ ADPP8206 (EX 1C) |
| --- | --- | --- | --- | --- |
| Brookfield viscosity RVT Spindle6 [mPas], 20 rpm, 2% solution | 41000 | 32000 | 30650 | 29200 |
| Water factor | 0.195 | 0.195 | 0.195 | 0.195 |

TABLE 6-continued

Water retention of different MHEC/HEC = 50/50 blends in EIFS external finishing insulation systems

|  | MHPC | MHEC2/ HEC | MHEC2/ ADPP8204 (EX 1A) | MHEC2/ ADPP8206 (EX 1C) |
| --- | --- | --- | --- | --- |
| Water retention (%), 20° C. | 99.1 | 99.0 | 99.1 | 99.2 |
| Water retention (%), 60° C. | 80.1 | 98.1 | 99.1 | 98.8 |

While the invention has been described with respect to specific embodiments, it should be understood that the invention should not be limited thereto and that many variations and modifications are possible without departing from the spirit and scope of the invention.

What is claimed is:

1. A cement-based system comprising:
cement,
filler/aggregate, and
a rheology control agent comprising a low molar, homogeneously substituted hydroxyethylcellulose which has no further substitution by a hydrocarbon radical,
wherein the molar substitution of the low molar, homogenously substituted hydroxyethylcellulose is in a range of from about 1.8 to about 2.2 and wherein the low molar, homogenously substituted hydroxyethylcellulose is characterized by a molar substitution/degree of substitution ratio of less than 1.60.

2. The cement-based system claimed in claim 1, wherein the rheology control agent is present in an amount of about 0.1% to about 1% by weight, based on the weight of the cement-based system on a dry basis.

3. The cement-based system of claim 2, wherein the rheology control agent comprises a blend of the low molar, homogeneously substituted hydroxyethylcellulose with a second cellulose ether comprising a hydrocarbon radical that is less hydrophilic than the low molar, homogenously substituted hydroxyethylcellulose.

4. The cement-based system of claim 3, wherein the second cellulose ether is selected from the group consisting of methylhydroxyethylcellulose and methylhydroxypropylcellulose.

5. The cement-based system of claim 3, wherein the second cellulose ether comprises methylhydroxyethylcellulose.

6. The cement-based system of claim 3, wherein the blend has a ratio of the second cellulose ether to the low molar, homogenously substituted hydroxyethylcellulose of about 10:90 to about 90:10 by weight.

7. The cement-based system of claim 6, wherein the blend has a ratio of the second cellulose ether to the low molar, homogenously substituted hydroxyethylcellulose of about 30:70 to about 70:30 by weight.

8. The cement-based system of claim 6, wherein the blend has a ratio of the second cellulose ether to the low molar, homogenously substituted hydroxyethylcellulose of about 50:50 by weight.

* * * * *